US012665521B2

(12) United States Patent
Mao et al.

(10) Patent No.: US 12,665,521 B2
(45) Date of Patent: Jun. 23, 2026

(54) CONVERTER AND CONTROL METHOD OF SENDING PWM DRIVER GATING SIGNAL THEREOF

(71) Applicant: Huawei Digital Power Technologies Co., Ltd., Shenzhen (CN)

(72) Inventors: Zhu Mao, Shenzhen (CN); Yaowei Hu, Shenzhen (CN); Jun Zhao, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/763,267

(22) Filed: Jul. 3, 2024

(65) Prior Publication Data

US 2025/0015730 A1      Jan. 9, 2025

(30) Foreign Application Priority Data

Jul. 5, 2023    (CN) ........................ 202310818011.X

(51) Int. Cl.
| | |
|---|---|
| *H02M 7/5387* | (2007.01) |
| *H02M 1/00* | (2006.01) |
| *H02M 5/293* | (2006.01) |
| *H02M 7/48* | (2007.01) |

(52) U.S. Cl.
CPC ....... *H02M 5/2932* (2021.05); *H02M 1/0058* (2021.05); *H02M 7/53871* (2013.01); *H02M 7/4815* (2021.05)

(58) Field of Classification Search
CPC ............. H02M 5/2932; H02M 7/5387; H02M 7/53871; H02M 1/0058
See application file for complete search history.

(56) References Cited

U.S. PATENT DOCUMENTS

2025/0317049 A1* 10/2025 Chen ..................... H02M 7/797

FOREIGN PATENT DOCUMENTS

| | | |
|---|---|---|
| CN | 114900027 A | 8/2022 |
| CN | 115588988 A | 1/2023 |

* cited by examiner

*Primary Examiner* — Alex Torres-Rivera
(74) *Attorney, Agent, or Firm* — Maier & Maier, PLLC

(57) ABSTRACT

A converter and a control method of sending a pulse width modulation (PWM) driver gating signal thereof. When an alternating current voltage output by the converter is in an O area, the converter may be controlled to switch between an upper half-bridge arm straight-through mode and a lower half-bridge arm straight-through mode. In this way, it can be ensured that there is a freewheeling path for a current in an inductive component, and a problem that a switching transistor of a secondary-side circuit is in a straight-through state is avoided.

20 Claims, 11 Drawing Sheets

CONVERTER AND CONTROL METHOD OF SENDING PWM DRIVER GATING SIGNAL THEREOF

CROSS-REFERENCE TO RELATED APPLICATION

This application claims priority to Chinese Patent Application No. 202310818011.X, filed on Jul. 5, 2023, which is hereby incorporated by reference in its entirety.

TECHNICAL FIELD

The embodiments relate to the field of power electronics technologies, and to a converter and a control method of sending a pulse width modulation (PWM) driver gating signal thereof.

BACKGROUND

For various converters that use bidirectional switches as half-bridge arms on a secondary side for a grid connection, to control an output voltage and power, an alternating current voltage at an output port may be sampled. However, a one-stage or multi-stage filter circuit may exist between the output port and the bidirectional switch. Therefore, there is a phase difference and an amplitude difference between the alternating current voltage at the output port and an output voltage of the bidirectional switch. In this case, a polarity of the output voltage of the bidirectional switch cannot be accurately determined based on the detected alternating current voltage at the output port. When the alternating current voltage at the output port is low, once the polarity of the output voltage of the bidirectional switch is incorrectly determined, bidirectional switches may be all turned off or all turned on. In this case, there is no free-wheeling path for a current, or a switching transistor of a secondary-side circuit is in a straight-through state. Consequently, the switching transistor is damaged.

SUMMARY

Embodiments provide a converter and a control method of sending a pulse width modulation (PWM) driver gating signal thereof. In a process of sending a PWM driver gating signal, a freewheeling path for a current can be ensured and a problem that a switching transistor is in a straight-through state can be avoided.

To achieve the foregoing objective, the following solutions are used in the embodiments.

According to a first aspect in embodiments, a converter is provided, and may include a transformer, an inductive component, a primary-side circuit, a secondary-side circuit, and a controller. The primary-side circuit is connected to a primary-side winding of the transformer. The primary-side circuit is configured to convert an input direct current voltage into a high-frequency alternating current rectangular wave signal. The secondary-side circuit is connected in series to the inductive component and then connected to a secondary-side winding of the transformer. The secondary-side circuit is configured to convert the high-frequency alternating current rectangular wave signal into an alternating current voltage for output. The secondary-side circuit may include a half-bridge circuit and a filter circuit. The half-bridge circuit may include a bridge arm, a first capacitor, and a second capacitor. The bridge arm includes an upper half-bridge arm and a lower half-bridge arm, and the upper half-bridge arm or the lower half-bridge arm includes two switching transistors with opposite freewheeling directions. A connection point of the upper half-bridge arm and the lower half-bridge arm is connected to one end of the secondary-side winding of the transformer by using the inductive component. The first capacitor and the second capacitor are connected in series and then disposed in parallel to the bridge arm. A connection point of the first capacitor and the second capacitor is connected to the other end of the secondary-side winding of the transformer. The filter circuit includes a third capacitor connected in parallel to the bridge arm.

Both the primary-side circuit and the secondary-side circuit in the converter provided in this embodiment are controlled by the controller. The controller is configured to control switching transistors in the secondary-side circuit to send a PWM driver gating signal. When it is determined by the controller that an alternating current voltage output by the converter is greater than or equal to a specified negative voltage threshold and is less than or equal to a specified positive voltage threshold, the converter may be controlled to switch between an upper half-bridge arm straight-through mode and a lower half-bridge arm straight-through mode. In the upper half-bridge arm straight-through mode, the inductive component, the upper half-bridge arm, the third capacitor, the second capacitor, and the secondary-side winding form a current path. In the lower half-bridge arm straight-through mode, the inductive component, the lower half-bridge arm, the third capacitor, the first capacitor, and the secondary-side winding form a current path.

For example, when it is determined by the controller that a current flowing through the inductive component is greater than or equal to a specified negative current threshold and is less than or equal to a specified positive current threshold, all switching transistors in the upper half-bridge arm or the lower half-bridge arm that is in a straight-through state may first be controlled to be turned off, and then all switching transistors in the upper half-bridge arm or the lower half-bridge arm that is in a cut-off state may be controlled to be turned on, to enable the converter to implement mutual switching between the upper half-bridge arm straight-through mode and the lower half-bridge arm straight-through mode. When it is determined by the controller that the current flowing through the inductive component is less than the specified negative current threshold or is greater than the specified positive current threshold, sequentially, some switching transistors in the upper half-bridge arm or the lower half-bridge arm that is in the straight-through state may be controlled to be turned off, some switching transistors in the upper half-bridge arm or the lower half-bridge arm that is in the cut-off state may be controlled to be turned on, all switching transistors in the upper half-bridge arm or the lower half-bridge arm that is in the straight-through state may be controlled to be turned off, and all switching transistors in the upper half-bridge arm or the lower half-bridge arm that is in the cut-off state may be controlled to be turned on, to enable the converter to implement mutual switching between the upper half-bridge arm straight-through mode and the lower half-bridge arm straight-through mode.

When the controller of the converter provided in this embodiment is controlled to send a PWM driver gating signal, a polarity of an obtained alternating current voltage and a polarity of a current may be determined, to ensure that there is an effective freewheeling path for a current in the inductive component, and avoid a problem that the switching transistor of the secondary-side circuit is in a straight-through state. This eliminates a risk of damage to the switching transistor caused by inaccurate determination of the polarity of the alternating current voltage.

In some embodiments, the upper half-bridge arm of the converter may include a sixth switching transistor and an eighth switching transistor that are connected in series, and the lower half-bridge arm may include a fifth switching transistor and a seventh switching transistor that are connected in series. Freewheeling directions of the fifth switching transistor and the sixth switching transistor both point to the connection point of the upper half-bridge arm and the lower half-bridge arm, and freewheeling directions of the seventh switching transistor and the eighth switching transistor both point away from the connection point of the upper half-bridge arm and the lower half-bridge arm.

In some embodiments, the sixth switching transistor may be connected between the eighth switching transistor and the inductive component. In some other embodiments, the eighth switching transistor may alternatively be connected between the sixth switching transistor and the inductive component.

In some embodiments, the fifth switching transistor may be connected between the seventh switching transistor and the inductive component. In some other embodiments, the seventh switching transistor may alternatively be connected between the fifth switching transistor and the inductive component.

In some embodiments, when it is determined by the controller that the current flowing through the inductive component is greater than or equal to the specified negative current threshold and is less than or equal to the specified positive current threshold, the controller may first control both the sixth switching transistor and the eighth switching transistor that are in a turned-on state to be turned off, and then control both the fifth switching transistor and the seventh switching transistor that are in a turned-off state to be turned on, to enable the converter to switch from the upper half-bridge arm straight-through mode to the lower half-bridge arm straight-through mode.

In some embodiments, when it is determined by the controller that the current flowing through the inductive component is greater than or equal to the specified negative current threshold and is less than or equal to the specified positive current threshold, the controller may first control both the fifth switching transistor and the seventh switching transistor that are in a turned-on state to be turned off, and then control both the sixth switching transistor and the eighth switching transistor that are in a turned-off state to be turned on, to enable the converter to switch from the lower half-bridge arm straight-through mode to the upper half-bridge arm straight-through mode.

In some embodiments, when it is determined by the controller that the current flowing through the inductive component is greater than the specified positive current threshold, the controller may sequentially control the eighth switching transistor in a turned-on state to be turned off, control the fifth switching transistor in a turned-off state to be turned on, control the sixth switching transistor in the turned-on state to be turned off, and control the seventh switching transistor in the turned-off state to be turned on, to enable the converter to switch from the upper half-bridge arm straight-through mode to the lower half-bridge arm straight-through mode.

In some embodiments, when it is determined by the controller that the current flowing through the inductive component is greater than the specified positive current threshold, the controller may sequentially control the seventh switching transistor in a turned-on state to be turned off, control the sixth switching transistor in a turned-off state to be turned on, control the fifth switching transistor in the turned-on state to be turned off, and control the eighth switching transistor in the turned-off state to be turned on, to enable the converter to switch from the lower half-bridge arm straight-through mode to the upper half-bridge arm straight-through mode.

In some embodiments, when it is determined by the controller that the current flowing through the inductive component is less than the specified negative current threshold, the controller may sequentially control the sixth switching transistor in a turned-on state to be turned off, control the seventh switching transistor in a turned-off state to be turned on, control the eighth switching transistor in the turned-on state to be turned off, and control the fifth switching transistor in the turned-off state to be turned on, to enable the converter to switch from the upper half-bridge arm straight-through mode to the lower half-bridge arm straight-through mode.

In some embodiments, when it is determined by the controller that the current flowing through the inductive component is less than the specified negative current threshold, the controller may sequentially control the fifth switching transistor in a turned-on state to be turned off, control the eighth switching transistor in a turned-off state to be turned on, control the seventh switching transistor in the turned-on state to be turned off, and control the sixth switching transistor in the turned-off state to be turned on, to enable the converter to switch from the lower half-bridge arm straight-through mode to the upper half-bridge arm straight-through mode.

In this embodiment, the controller needs to ensure that after each switching action of controlling a switching transistor to change an on-off state is completed, a next switching transistor is controlled to start to perform the switching action to change the on-off state. In other words, before each on-off state switching action of the switching transistor is performed, it needs to be ensured that an on-off state switching action of a previous switching transistor is fully completed.

According to a second aspect in embodiments, a control method of sending a PWM driver gating signal for a converter is provided. A specific structure of the converter may be applicable to the first aspect in embodiments. Details are not described herein again. The control method of sending a PWM driver gating signal may include the following steps.

When it is determined that an alternating current voltage output by the converter is greater than or equal to a specified negative voltage threshold and is less than or equal to a specified positive voltage threshold, the converter may be controlled to switch between an upper half-bridge arm straight-through mode and a lower half-bridge arm straight-through mode. In the upper half-bridge arm straight-through mode, an inductive component, an upper half-bridge arm, a third capacitor, a second capacitor, and a secondary-side winding form a current path. In the lower half-bridge arm straight-through mode, the inductive component, a lower half-bridge arm, the third capacitor, a first capacitor, and the secondary-side winding form a current path.

For example, when it is determined that a current flowing through the inductive component is greater than or equal to a specified negative current threshold and is less than or equal to a specified positive current threshold, all switching transistors in the upper half-bridge arm or the lower half-bridge arm that is in a straight-through state may first be controlled to be turned off, and then all switching transistors in the upper half-bridge arm or the lower half-bridge arm that is in a cut-off state may be controlled to be turned on, to enable the converter to implement mutual switching between the upper half-bridge arm straight-through mode and the lower half-bridge arm straight-through mode.

When it is determined that the current flowing through the inductive component is less than the specified negative current threshold or is greater than the specified positive current threshold, sequentially, some switching transistors in the upper half-bridge arm or the lower half-bridge arm that is in the straight-through state may be controlled to be turned off, some switching transistors in the upper half-bridge arm or the lower half-bridge arm that is in the cut-off state may be controlled to be turned on, all switching transistors in the upper half-bridge arm or the lower half-bridge arm that is in the straight-through state may be controlled to be turned off, and all switching transistors in the upper half-bridge arm or the lower half-bridge arm that is in the cut-off state may be controlled to be turned on, to enable the converter to implement mutual switching between the upper half-bridge arm straight-through mode and the lower half-bridge arm straight-through mode.

According to the foregoing control method of sending a PWM driver gating signal provided in this embodiment, a polarity of an obtained alternating current voltage and a polarity of a current may be determined, to ensure that there is an effective freewheeling path for a current in the inductive component, and avoid a problem that the switching transistor of the secondary-side circuit is in a straight-through state. This eliminates a risk of damage to the switching transistor caused by inaccurate determination of the polarity of the alternating current voltage.

For effects that can be achieved in the second aspect, refer to the descriptions of effects that can be achieved in any one of the possible implementations or designs in the first aspect. Details are not described herein again.

DETAILED DESCRIPTION OF EMBODIMENTS

The following describes the solutions in embodiments with reference to the accompanying drawings. It is clearly that the described embodiments are merely some, rather than all, of the embodiments.

The terms such as "first" and "second" below are merely for ease of description, and cannot be construed as indicating or implying relative importance or implicitly indicating a quantity of indicated features. Therefore, a feature limited by "first", "second", or the like may explicitly or implicitly include one or more features. In descriptions of the embodiments, unless otherwise stated, "a plurality of" means two or more.

In addition, in embodiments, orientation terms such as "up", "down", "left", and "right" may include, but are not limited to, being defined relative to placement orientations of components shown in the accompanying drawings. It should be understood that these directional terms may be relative concepts and are used for relative description and clarification, and may vary correspondingly based on changes of the placement orientations of the components in the accompanying drawings.

In embodiments, it should be noted that a term "connection" should be understood in a broad sense unless otherwise expressly specified and limited. For example, the "connection" may be a fixed connection, or may be a detachable connection or an integrated connection; and may be a direct connection, or may be an indirect connection through an intermediate medium. In addition, the term "coupling" may be a direct electrical connection, or may be an indirect electrical connection through an intermediate medium. The term "contact" may be direct contact or indirect contact through an intermediate medium.

In embodiments, and/or describes an association relationship between associated objects, and represents that three relationships may exist. For example, A and/or B may represent the following cases: only A exists, both A and B exist, and only B exists, where A and B may be singular or plural. The character "/" generally indicates an "or" relationship between the associated objects.

Figure 1A:
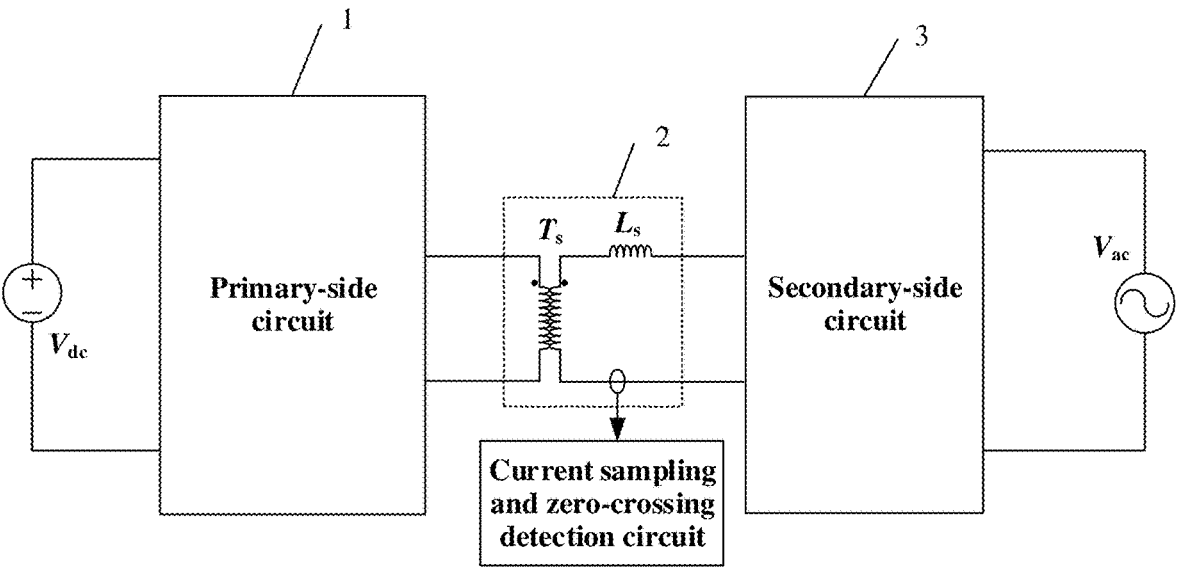
FIG. 1a is a diagram of a structure of a converter according to an embodiment.
Figure 1B:
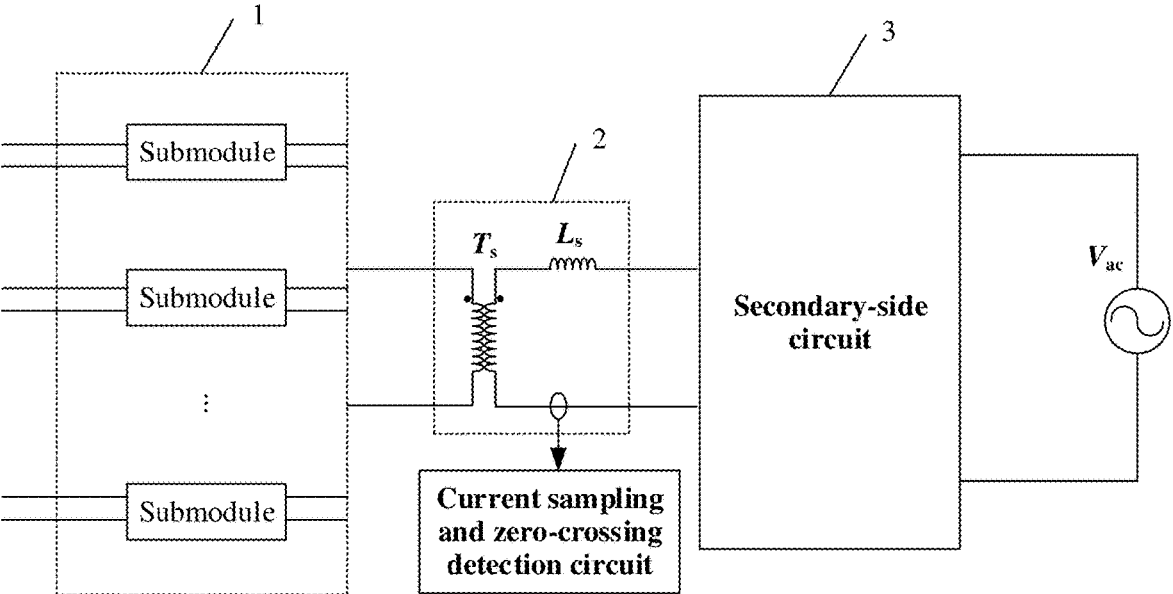
FIG. 1b is a diagram of another structure of a converter according to an embodiment.
Figure 2A:
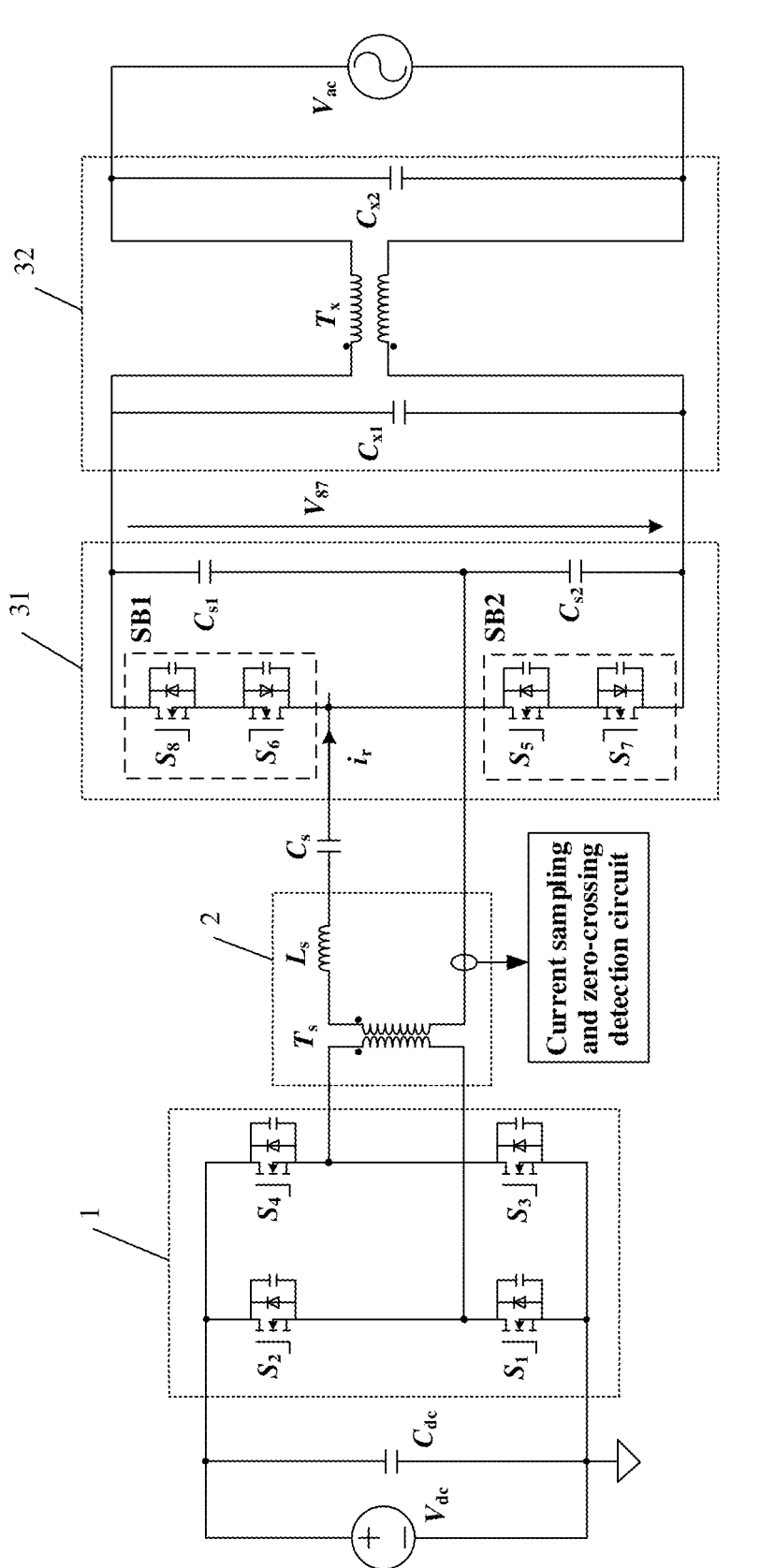
FIG. 2a is a schematic of a circuit structure of a converter according to an embodiment.
Figure 2B:
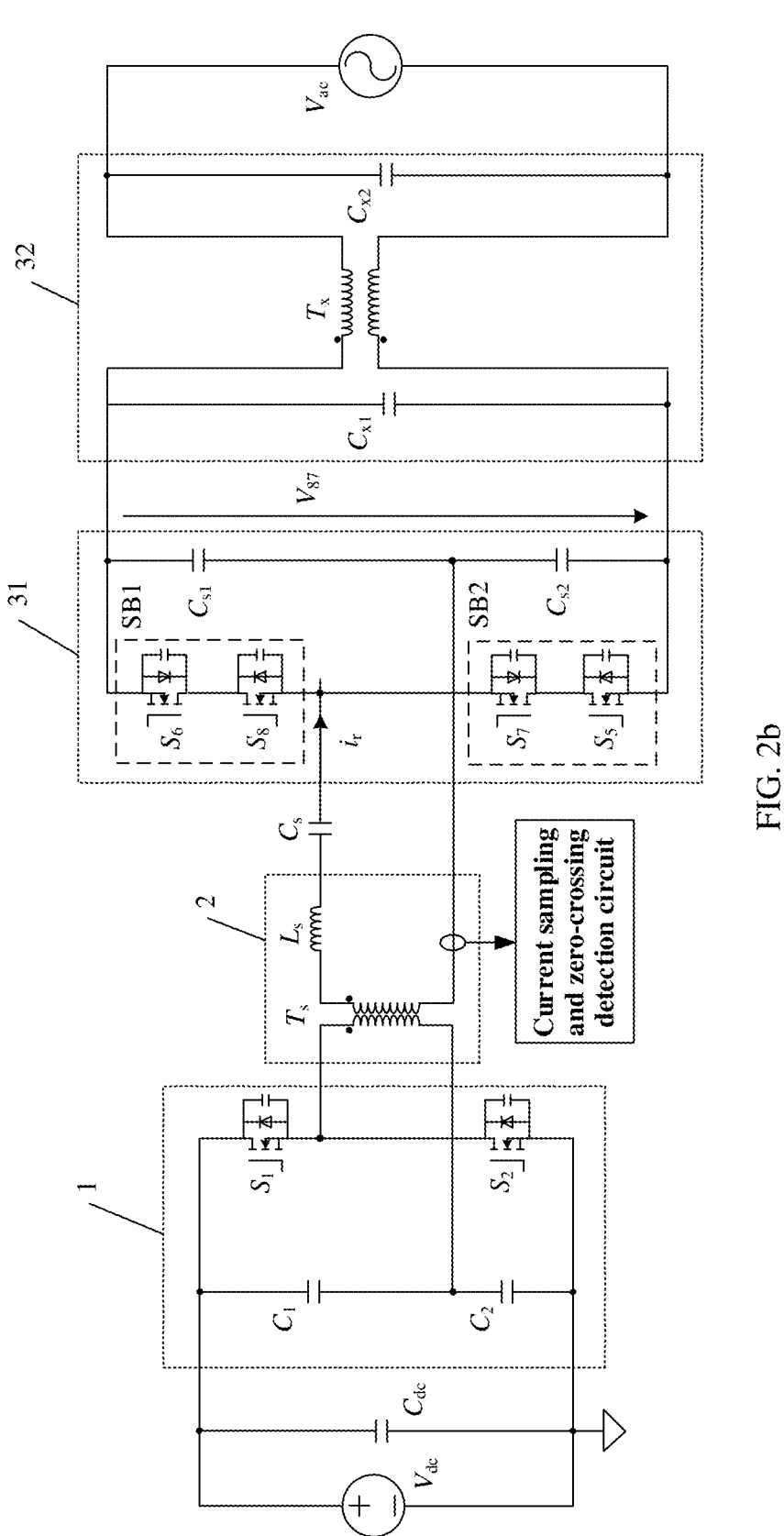
FIG. 2b is a schematic of another circuit structure of a converter according to an embodiment.

FIG. 1a is a diagram of a structure of a converter according to an embodiment. FIG. 1b is a diagram of another structure of a converter according to an embodiment. FIG. 2a is a schematic of a circuit structure of a converter according to an embodiment. FIG. 2b is a schematic of another circuit structure of a converter according to an embodiment.

As shown in FIG. 1a, a converter provided in this embodiment may include a transformer 2, an inductive component $L_s$, a primary-side circuit 1, a secondary-side circuit 3, and a controller (not shown in the figure). The converter provided in this embodiment may be applicable to a single-stage isolated inverter topology.

One end of the primary-side circuit 1 is configured to input a direct current voltage $V_{dc}$, and the other end of the primary-side circuit 1 is connected to a primary-side winding of the transformer 2. The primary-side circuit 1 is configured to convert the input direct current voltage $V_{dc}$ into a high-frequency alternating current rectangular wave signal. As shown in FIG. 1b, the primary-side circuit 1 may alternatively be developed into a configuration including a plurality of submodules connected in series or parallel. Each submodule may be a half-bridge circuit or a full-bridge circuit. As shown in FIG. 2a, the primary-side circuit 1 may alternatively be a full-bridge circuit including a first switching transistor $S_1$, a second switching transistor $S_2$, a third switching transistor $S_3$, and a fourth switching transistor $S_4$. As shown in FIG. 2b, the primary-side circuit 1 may alternatively be a half-bridge circuit including a first switching transistor $S_1$, a second switching transistor $S_2$, a first bridge arm capacitor $C_1$, and a second bridge arm capacitor $C_2$, or the primary-side circuit 1 may be any other circuit that can convert a direct current into a high-frequency alternating current rectangular wave signal.

The transformer 2 may be designed as a transformer whose inductance of a secondary-side leakage inductance is equal to $L_s$, so that the inductive component $L_s$ connected in series to a secondary-side winding of the transformer 2 may be the secondary-side leakage inductance of the transformer 2. Alternatively, as shown in FIG. 1a and FIG. 1b, the transformer 2 may be designed as a transformer with small leakage inductance, and the inductive component $L_s$ connected in series is separately disposed. As shown in FIG. 2a and FIG. 2b, the secondary-side circuit 3 may further include a capacitor $C_s$ connected in series to the inductive component $L_s$, and the capacitor $C_s$ is used as a direct-current blocking capacitor or a resonant capacitor.

One end of the secondary-side circuit 3 is configured to output an alternating current voltage $V_{ac}$, and the other end of the secondary-side circuit 3 is connected in series to the inductive component $L_s$ and then connected to the secondary-side winding of the transformer 2. The secondary-side circuit 3 is configured to convert the high-frequency alternating current rectangular wave signal into the alternating current voltage $V_{ac}$ for output. As shown in FIG. 2a and FIG. 2b, the secondary-side circuit 3 may include a half-bridge circuit 31. The half-bridge circuit 31 may include a bridge arm, a first capacitor $C_{s1}$, and a second capacitor $C_{s2}$. The bridge arm includes an upper half-bridge arm and a lower half-bridge arm. The upper half-bridge arm may include a bidirectional switch SB1. The lower half-bridge arm may include a bidirectional switch SB2. Both the upper half-bridge arm and the lower half-bridge arm include two switching transistors with opposite freewheeling directions. A connection point of the two bidirectional switches SB1 and SB2, such as a connection point of the upper half-bridge arm and the lower half bridge, serves as a midpoint of the bridge arm, and may be connected in series to the inductive component $L_s$ and then connected to one end of the secondary-side winding of the transformer 2. The first capacitor $C_{s1}$ and the second capacitor $C_{s2}$ are connected in series and then disposed in parallel to the bridge arm. A connection point of the first capacitor $C_{s1}$ and the second capacitor $C_{s2}$ is connected to the other end of the secondary-side winding of the transformer. The secondary-side circuit 3 may further include a filter circuit 32. One side of the filter circuit 32 is connected to the half-bridge circuit 31, and the other side is connected to an output end of the alternating current voltage $V_a$c. The filter circuit 32 may be of single-stage or multi-stage. FIG. 2a and FIG. 2b are merely examples of a possible implementation structure of the filter circuit 32, and are not limited thereto. As shown in FIG. 2a and FIG. 2b, for example, the filter circuit 32 may include a third capacitor $C_{x1}$ connected in parallel to the bridge arm, a fourth capacitor $C_{x2}$ connected in parallel to the output end of the alternating current voltage $V_{ac}$, and a filter transformer $T_x$ connected between the third capacitor $C_{x1}$ and the fourth capacitor $C_{x2}$.

The switching transistor in the secondary-side circuit 3 may be a metal-oxide-semiconductor field-effect transistor (MOSFET), or may be an insulated gate bipolar transistor (IGBT), a gallium nitride (GaN) high electron mobility transistor (HEMT), or the like. For example, the upper half-bridge arm or the lower half-bridge arm may include two discretely disposed switching transistors, or may include an assembly integrating two switching transistors, or may include a monolithic bidirectional (on or off) device (for example, a monolithic bidirectional GaN device). For example, the upper half-bridge arm includes an eighth switching transistor $S_8$ and a sixth switching transistor $S_6$ that are connected in series, and the lower half-bridge arm includes a fifth switching transistor $S_5$ and a seventh switching transistor $S_7$ that are connected in series. For example, that two ports that are of each switching transistor and that are connected to a power loop are a port 1 and a port 2 may be defined. When the switching transistor is turned on, a current may flow in from the port 1 and flow out from the port 2, or may flow in from the port 2 and flow out from the port 1. When the switching transistor is in a freewheeling state, a current flows in from the port 2 and flows out from the port 1. That freewheeling directions of the fifth switching transistor $S_5$ and the sixth switching transistor $S_6$ both point to the connection point of the upper half-bridge arm and the lower half-bridge arm, and freewheeling directions of the seventh switching transistor $S_7$ and the eighth switching transistor $S_8$ both point away from the connection point of the upper half-bridge arm and the lower half-bridge arm may be defined. In the half-bridge arm, a switching transistor connected to one end of the secondary-side winding may be defined as an inner switching transistor, and a switching transistor connected to the alternating current voltage $V_{ac}$ may be defined as an outer switching transistor. The inner switching transistor is connected between (which may also be considered as the connection point of the upper half-bridge arm and the lower half-bridge arm) the outer switching transistor and the inductive component $L_s$. As shown in FIG. 2a, in the half-bridge arm, a port 2 of the outer switching transistor may be connected to a port 1 of the inner switching transistor, so that freewheeling directions of two switching transistors in one half-bridge arm both point away from a direction of a connection point of the two switching transistors. For example, in FIG. 2a, the fifth switching transistor $S_5$ and the sixth switching transistor $S_6$ are inner switching transistors, and the seventh switching transistor $S_7$ and the eighth switching transistor $S_8$ are outer switching transistors. Alternatively, as shown in FIG. 2b, in the half-bridge arm, a port 1 of the outer switching transistor may be connected to a port 2 of the inner switching transistor, so that freewheeling directions of two switching transistors in one half-bridge arm point to a direction of a connection point of the two switching transistors. For example, in FIG. 2b, the fifth switching transistor $S_5$ and the sixth switching transistor $S_6$ are outer switching transistors, and the seventh switching transistor $S_7$ and the eighth switching transistor $S_8$ are inner switching transistors. In addition, the switching transistors in the two half-bridge arms in the half-bridge circuit 31 may be connected in a same manner, or may be connected in different manners. For example, the switching transistors in the upper half-bridge arm are connected in the topology structure shown in FIG. 2*a*, and the switching transistors in the lower half-bridge arm are connected in the topology structure shown in FIG. 2*b*.

Both the primary-side circuit 1 and the secondary-side circuit 3 in the converter provided in this embodiment are controlled by the controller. The controller is configured to control switching transistors in the primary-side circuit 1 and the secondary-side circuit 3 to send a PWM driver gating signal. For example, to control an output voltage and power, the alternating current voltage $V_{ac}$ may be sampled. A one-stage or multi-stage filter circuit 32 may exist between the alternating current voltage $V_{ac}$ and a voltage $V_{87}$ at two ends of the seventh switching transistor $S_7$ and the eighth switching transistor $S_8$. Therefore, there is a phase difference and an amplitude difference between the alternating current voltage $V_{ac}$ and the voltage $V_{87}$ at two ends of the seventh switching transistor $S_7$ and the eighth switching transistor $S_8$. When the alternating current voltage $V_{ac}$ is low, a polarity of the voltage $V_{87}$ at two ends of the seventh switching transistor $S_7$ and the eighth switching transistor $S_8$ cannot be accurately determined based on the detected $V_{ac}$. Once the polarity of the voltage $V_{87}$ at two ends of the seventh switching transistor $S_7$ and the eighth switching transistor $S_8$ is incorrectly determined, the two half-bridge arms may be both disconnected or both connected. In this case, there is no freewheeling path for a current $i_r$, or a switching transistor of a secondary-side circuit is in a straight-through state. Consequently, the switching transistor is damaged.

Therefore, to implement secure logic of sending a PWM driver gating signal, the controller in the converter provided in this embodiment may perform the following control method of sending a PWM driver gating signal.

Figure 3:
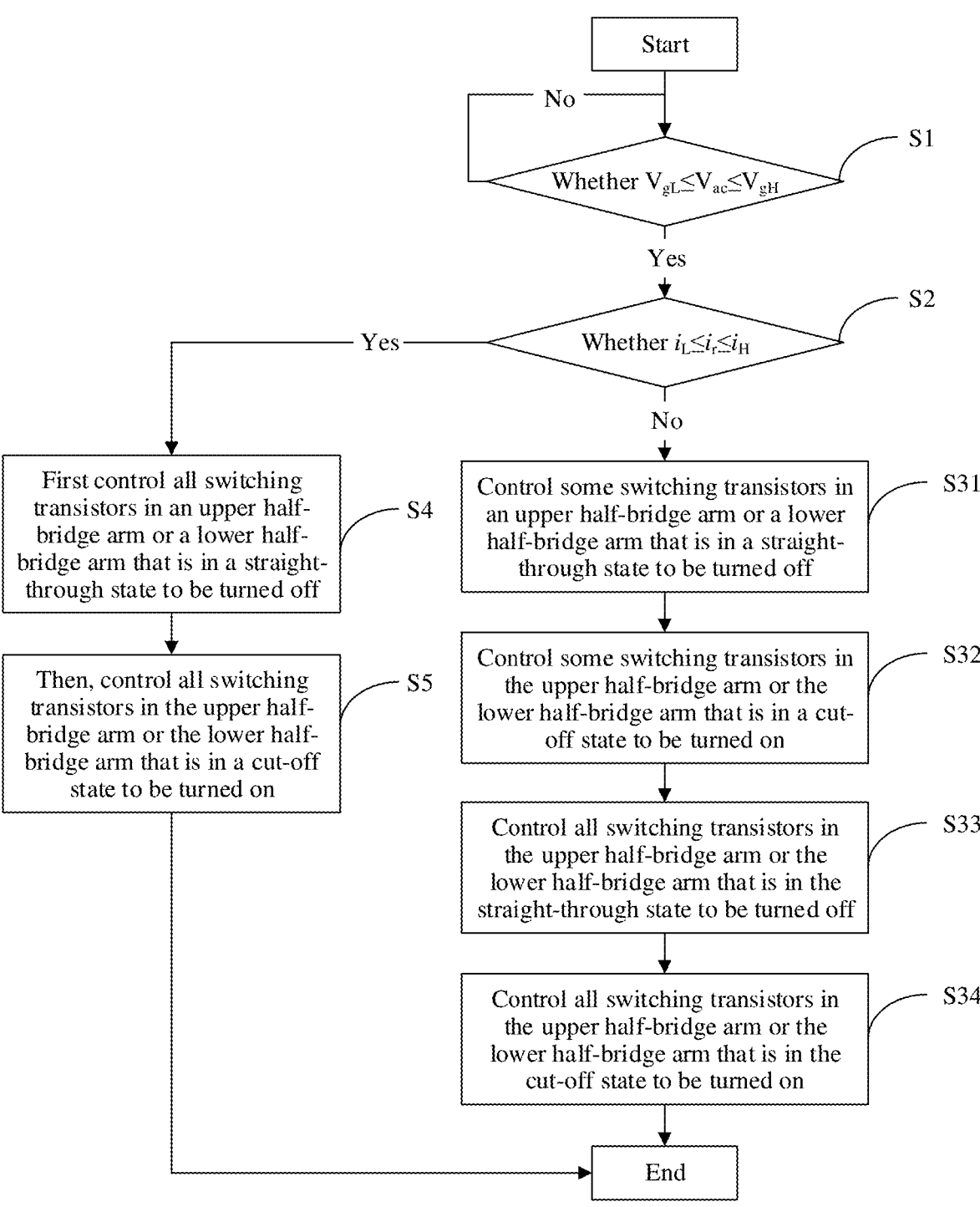
FIG. 3 is a schematic flowchart of a control method of sending a PWM driver gating signal for a converter according to an embodiment.
Figure 4:
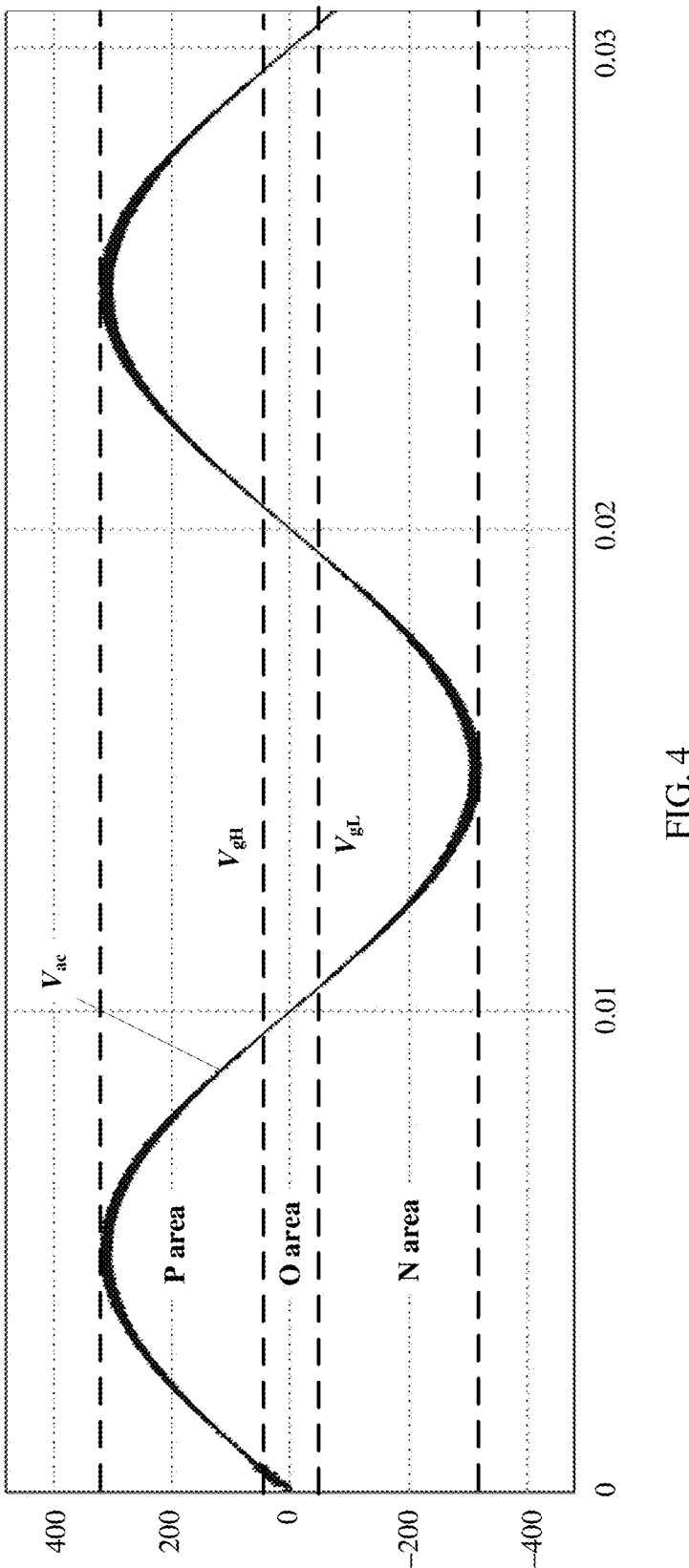
FIG. 4 is a diagram of an alternating current voltage partition range in a converter according to an embodiment.

FIG. 3 is a schematic flowchart of a control method of sending a PWM driver gating signal for a converter according to an embodiment. FIG. 4 is a diagram of an alternating current voltage partition range in a converter according to an embodiment.

As shown in FIG. 3, the control method of sending a PWM driver gating signal for the converter provided in this embodiment may include the following steps.

S1: Determine whether an alternating current voltage $V_{ac}$ output by a converter is greater than or equal to a specified negative voltage threshold $V_{gL}$ and is less than or equal to a specified positive voltage threshold $V_{gH}$, that is, whether $V_{gL} \leq V_{ac} \leq V_{gH}$. For example, the alternating current voltage $V_{ac}$ may be partitioned based on the specified positive voltage threshold $V_{gH}$ and the specified negative voltage threshold $V_{gL}$. For details, refer to Table 1. Absolute values of the specified positive voltage threshold $V_{gH}$ and the specified negative voltage threshold $V_{gL}$ may be the same or may be different. This is not limited herein. As shown in FIG. 4, when it is determined that $V_{ac} > V_{gH}$, it may be determined that the alternating current voltage $V_{ac}$ belongs to a P area; when it is determined that $V_{gL} > V_{ac}$, it may be determined that the alternating current voltage $V_{ac}$ belongs to an N area; and when it is determined that $V_{gL} \leq V_{ac} \leq V_{gH}$, it may be determined that the alternating current voltage $V_{ac}$ belongs to an O area.

TABLE 1

| Alternating current voltage $V_{ac}$ | P area | $V_{ac} > V_{gH}$ |
| --- | --- | --- |
| | N area | $V_{gL} > V_{ac}$ |
| | O area | $V_{gL} \leq V_{ac} \leq V_{gH}$ |

When it is determined that the alternating current voltage $V_{ac}$ belongs to the P area or the N area, it indicates that a polarity of the alternating current voltage $V_{ac}$ can be accurately determined. Therefore, a mode I of sending a PWM driver gating signal may be used, that is, the secondary-side circuit topology shown in FIG. 2*a* is used as an example. In a positive half cycle of the alternating current voltage $V_{ac}$, a fifth switching transistor $S_5$ and an eighth switching transistor $S_8$ are turned on in a complementary manner to perform an on-off action, and a sixth switching transistor $S_6$ and a seventh switching transistor $S_7$ are always turned on. In a negative half cycle of the alternating current voltage $V_{ac}$, the sixth switching transistor $S_6$ and the seventh switching transistor $S_7$ are turned on in a complementary manner to perform an on-off action, and the fifth switching transistor $S_5$ and the eighth switching transistor $S_8$ are always turned on.

When it is determined that the alternating current voltage $V_{ac}$ belongs to the O area, it indicates that the polarity of the alternating current voltage $V_{ac}$ cannot be accurately determined. Therefore, a mode II of sending a PWM driver gating signal may be used. The mode II of sending a PWM driver gating signal is used to control the converter to switch between an upper half-bridge arm straight-through mode and a lower half-bridge arm straight-through mode. In the upper half-bridge arm straight-through mode, an inductive component $L_s$, an upper half-bridge arm, a third capacitor $C_{x1}$, a second capacitor $C_{s2}$, and a secondary-side winding form a current path. In the lower half-bridge arm straight-through mode, the inductive component $L_s$, a lower half-bridge arm, the third capacitor $C_{x1}$, a first capacitor $C_{s1}$, and the secondary-side winding form a current path. In addition, when switching from the mode I of sending a PWM driver gating signal to the mode II of sending a PWM driver gating signal is performed, the secondary-side circuit topology shown in FIG. 2*a* is used as an example. An initial state of each switching transistor needs to be switched to the upper half-bridge arm straight-through mode. For example, the eighth switching transistor $S_8$ and the sixth switching transistor $S_6$ are in a turned-on state. Alternatively, an initial state of each switching transistor needs to be switched to the lower half-bridge arm straight-through mode. For example, the fifth switching transistor $S_5$ and the seventh switching transistor $S_7$ are in a turned-on state. Then, steps S2 to S5 are performed, to implement mutual switching of the converter between the upper half-bridge arm straight-through mode and the lower half-bridge arm straight-through mode.

S2: Determine whether a current $i_r$ flowing through the inductive component is greater than or equal to a specified negative current threshold $i_L$ and is less than or equal to a specified positive current threshold $i_H$, that is, whether $i_L \leq i_r \leq i_H$. Absolute values of the specified negative current threshold $i_L$ and the specified positive current threshold $i_H$ may be the same or may be different. This is not limited herein. When it is determined that $i_L \leq i_r \leq i_H$, it may be considered that the current $i_r$ flowing through the inductive component is approximately zero, and steps S4 and S5 may be performed; or when it is determined that iL>ir>iH, steps S31 to S34 are performed. For example, when it is determined that $i_L > i_r$, it may be considered that the current $i_r$ flowing through the inductive component is negative; and when it is determined that $i_r > i_H$, it may be considered that the current $i_r$ flowing through the inductive component is positive.

Figure 5:
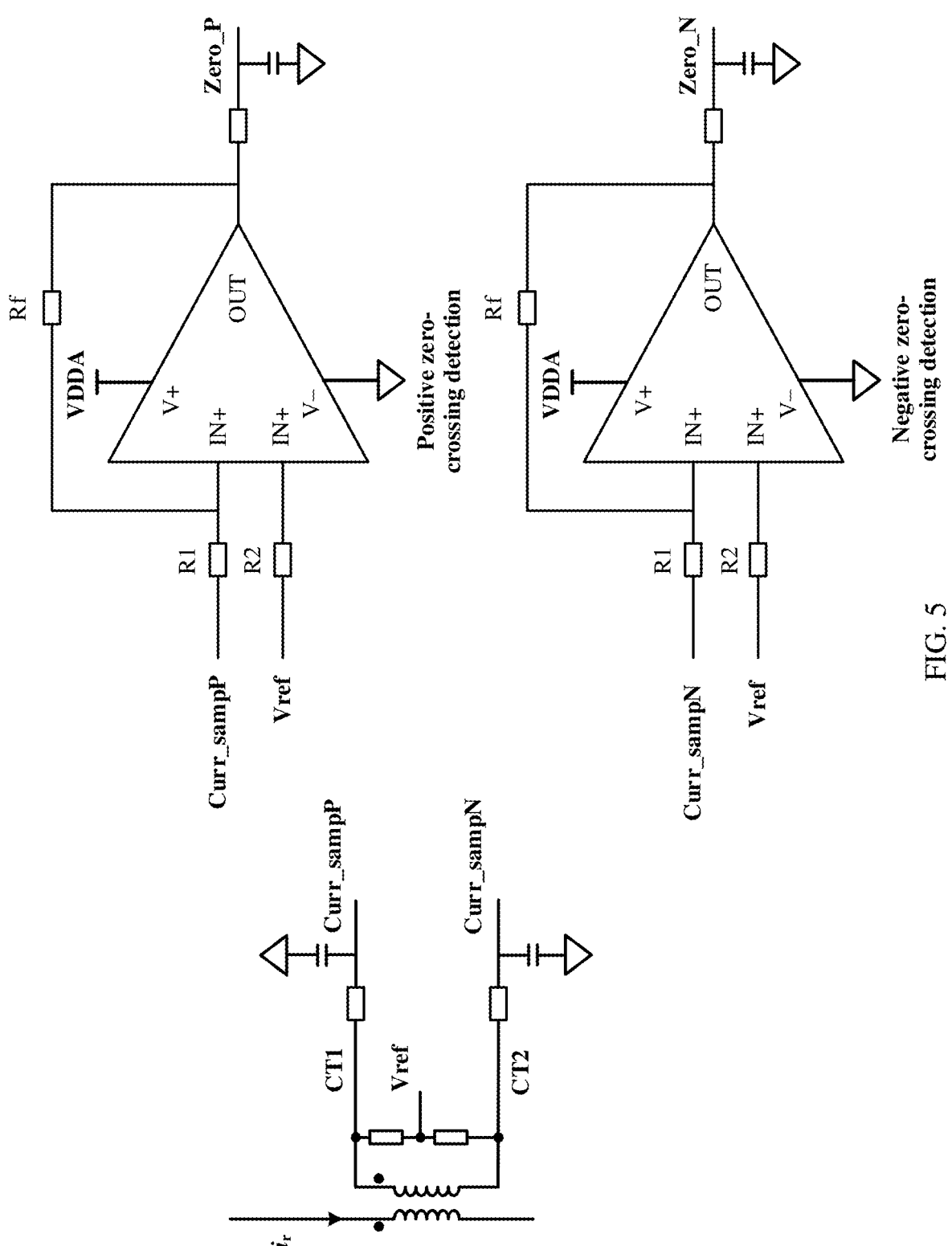
FIG. 5 is a schematic of a structure of an inductance current sampling and zero-crossing detection circuit of a converter according to an embodiment.
Figure 6:
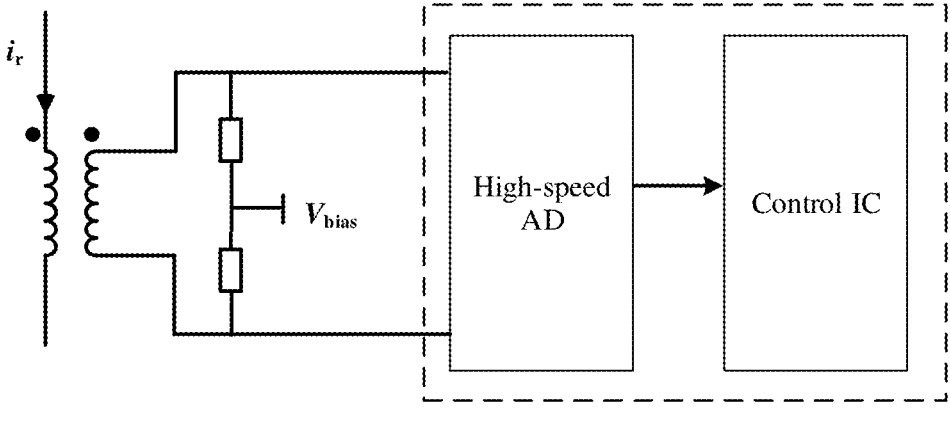
FIG. 6 is a schematic of another structure of an inductance current sampling and zero-crossing detection circuit of a converter according to an embodiment.

FIG. 5 is a schematic of a structure of an inductance current sampling and zero-crossing detection circuit of a converter according to an embodiment. FIG. 6 is a schematic of another structure of an inductance current sampling and zero-crossing detection circuit of a converter according to an embodiment.

As shown in FIG. 5, when a polarity of a current $i_r$ is detected, the current $i_r$ may be first sampled by using a CT. Then, as shown in Table 2, the polarity of the current $i_r$ is determined by using two hysteresis comparator circuits.

TABLE 2

| Current $i_r$ | Zero_P is used to detect positive zero-crossing of a current |
| --- | --- |
| | Zero_N is used to detect negative zero-crossing of a current |
| | The current $i_r$ is positive      Zero_P = 1, Zero_N = 0 |
| | The current $i_r$ is negative      Zero_P = 0, Zero_N = 1 |
| | The current $i_r$ is approximately      Zero_P = 1, Zero_N = 1 |
| | zero (freewheeling to zero)      Zero_P = 0, Zero_N = 0 |

As shown in FIG. 6, when a polarity of a current $i_r$ is detected, the current $i_r$ may alternatively be first sampled by using a CT. Then, a current signal sampled in real time is sent to a control IC by using a high-speed AD, and the polarity of the current $i_r$ is determined by using a program in the control IC. In addition, the high-speed AD may be a discrete AD chip, or may be an on-chip peripheral AD integrated in the control IC.

In this embodiment, based on a current sampling requirement, the CT used for sampling the current $i_r$ may be further designed to be integrated with a transformer, to reduce a volume and costs.

S31: Control some switching transistors in an upper half-bridge arm or a lower half-bridge arm that is in a straight-through state to be turned off. For example, a switching transistor whose freewheeling direction in a bidirectional switch in a turned-on state is the same as a flow direction of a current in an inductive component in a freewheeling loop in a secondary-side circuit may be controlled to be turned off. After the switching transistor is completely turned off, step S32 is performed.

S32: Control some switching transistors in the upper half-bridge arm or the lower half-bridge arm that is in a cut-off state to be turned on. For example, a switching transistor whose freewheeling direction in the bidirectional switch in a turned-off state is opposite to the flow direction of the current in the inductive component in the freewheeling loop in the secondary-side circuit may be controlled to be turned on. After the switching transistor is completely turned on, step S33 is performed.

S33: Control all switching transistors in the upper half-bridge arm or the lower half-bridge arm that is in the straight-through state to be turned off. For example, a switching transistor whose freewheeling direction in the bidirectional switch in the turned-on state is opposite to the flow direction of the current in the inductive component in the freewheeling loop in the secondary-side circuit may be controlled to be turned off. After the switching transistor is completely turned off, step S34 is performed.

S34: Control all switching transistors in the upper half-bridge arm or the lower half-bridge arm that is in the cut-off state to be turned on. For example, a switching transistor whose freewheeling direction in the bidirectional switch in the turned-off state is the same as the flow direction of the current in the inductive component in the freewheeling loop in the secondary-side circuit is controlled to be turned on. According to steps S31 to S34, the converter can mutually switch between the upper half-bridge arm straight-through mode and the lower half-bridge arm straight-through mode.

S4: First control all switching transistors in the upper half-bridge arm or the lower half-bridge arm that is in the straight-through state to be turned off. For example, both two switching transistors in the bidirectional switch in the turned-on state are controlled to be turned off. After the two switching transistors are completely turned off, step S5 is performed.

S5: Then control all switching transistors in the upper half-bridge arm or the lower half-bridge arm that is in the cut-off state to be turned on. For example, both two switching transistors in another bidirectional switch in the turned-off state are controlled to be turned on. According to steps S4 and S5, the converter can mutually switch between the upper half-bridge arm straight-through mode and the lower half-bridge arm straight-through mode.

It should be noted that, it takes a specified time for the switching transistor to switch between the turned-on state and the turned-off state. Therefore, in the process of performing the foregoing steps S31 to S34 and steps S4 and S5, it needs to be ensured that after each switching action of controlling a switching transistor to change an on-off state is completed, that is, after the switching transistor is completely turned on or turned off, a next switching transistor is controlled to start to perform the switching action to change the on-off state. In other words, before each on-off state switching action of the switching transistor is performed, it needs to be ensured that an on-off state switching action of a previous switching transistor is fully completed.

According to the foregoing control method of sending a PWM driver gating signal provided in this embodiment, in the process of performing steps S31 to S34 and S4 to S5, a polarity of an obtained alternating current voltage and a polarity of a current may be determined, to ensure that there is an effective freewheeling path for a current in the inductive component, and avoid a problem that the switching transistor of the secondary-side circuit is in a straight-through state. This eliminates a risk of damage to the switching transistor caused by inaccurate determination of the polarity of the alternating current voltage.

In this embodiment, the secondary-side circuit topology shown in FIG. 2a is used as an example. In the mode II of sending a PWM driver gating signal, an initial state of each switching transistor may be that the eighth switching transistor $S_8$ and the sixth switching transistor $S_6$ are in the turned-on state, or the fifth switching transistor $S_5$ and the seventh switching transistor $S_7$ are in the turned-on state. A direction of the current $i_r$ flowing through the inductive component may be positive, negative, or approximately zero. There are six possible working conditions in total. The following describes, for each working condition, how to switch the on-off state of the switching transistors according to the control method of sending a PWM driver gating signal provided in this embodiment.

Figure 7A:
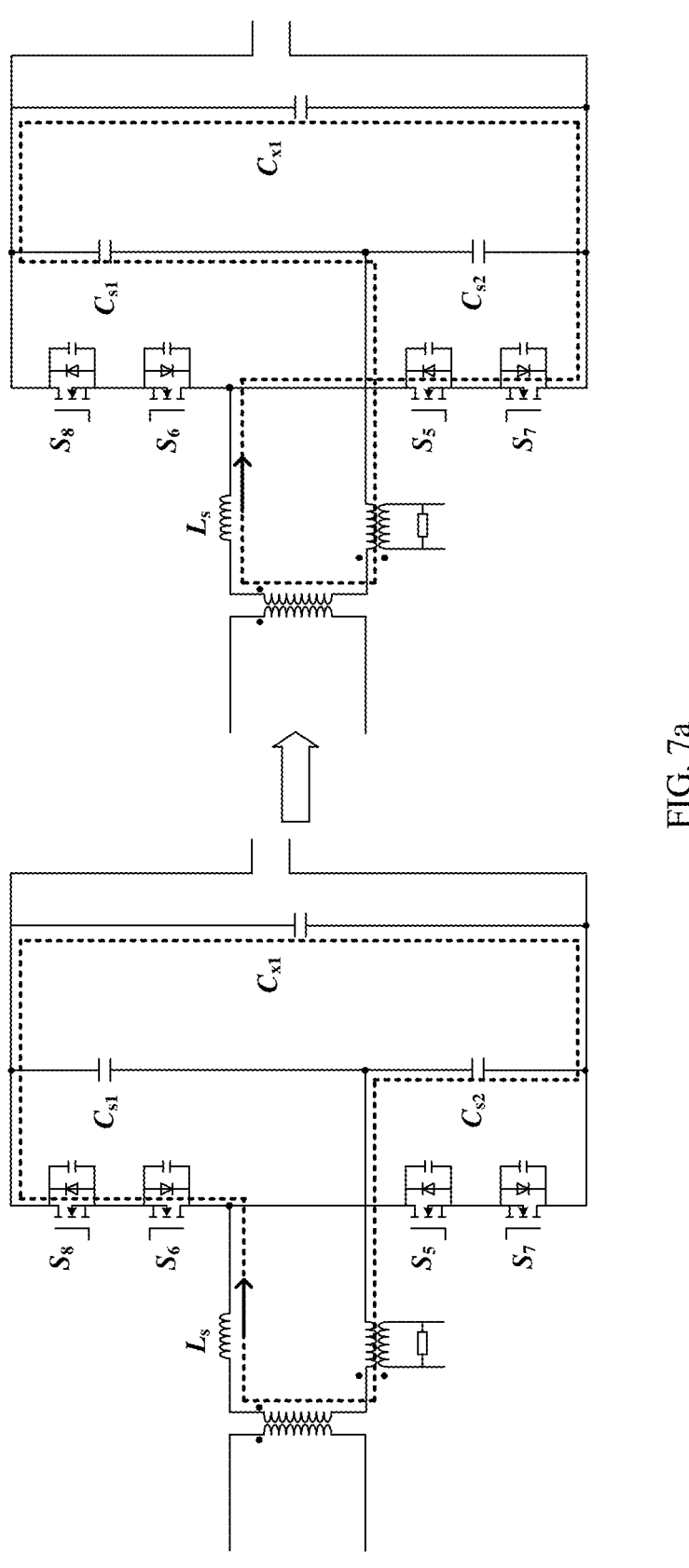
FIG. 7a is a schematic of a current freewheeling loop during switching of switching transistors in a control method of sending a PWM driver gating signal for a converter according to an embodiment.

FIG. 7a is a schematic of a current freewheeling loop during switching of switching transistors in a control method of sending a PWM driver gating signal for a converter according to an embodiment.

As shown in FIG. 7a, when it is determined that the current $i_r$ flowing through the inductive component is positive, an initial state of each switching transistor in the secondary-side circuit is that the eighth switching transistor $S_8$ and the sixth switching transistor $S_6$ are in the turned-on state, and the fifth switching transistor $S_5$ and the seventh switching transistor $S_7$ are in the turned-off state. Each switching transistor needs to be switched to a state that the eighth switching transistor $S_8$ and the sixth switching transistor $S_6$ are in the turned-off state, and the fifth switching transistor $S_5$ and the seventh switching transistor $S_7$ are in the turned-on state. As shown in Table 3-1, the following four steps need to be performed in the switching process. (1) The current $i_r$ flows along a dashed line in the left figure in FIG. 7a. Because a freewheeling direction of the eighth switching transistor $S_8$ in the turned-on state is the same as a flow direction of a current in the inductive component in a freewheeling loop in the secondary-side circuit, the eighth switching transistor $S_8$ may be turned off first. (2) After the eighth switching transistor $S_8$ is completely turned off, the current may be freewheeled through a diode of the eighth switching transistor $S_8$ to ensure a current freewheeling loop. For example, the current $i_r$ continues to flow along the dashed line in the left figure in FIG. 7a. Because a freewheeling direction of the fifth switching transistor $S_5$ in the turned-off state is opposite to the flow direction, the fifth switching transistor $S_5$ may be turned on. (3) After the fifth switching transistor $S_5$ is completely turned on, the sixth switching transistor $S_6$ whose freewheeling direction is opposite to the flow direction may be turned off. In this case, the current may be freewheeled through diodes of the fifth switching transistor $S_5$ and the seventh switching transistor $S_7$ to ensure a current freewheeling loop. For example, the current $i_r$ is switched to flow along a dashed line in the right figure in FIG. 7a. (4) After the sixth switching transistor $S_6$ is completely turned off, the seventh switching transistor $S_7$ whose freewheeling direction is the same as the flow direction may be turned on. In this case, the current may be freewheeled through the turned-on fifth switching transistor $S_5$ and the turned-on seventh switching transistor $S_7$ to ensure a current freewheeling loop.

TABLE 3-1

| $i_r > 0$ | Eighth switching transistor $S_8$ | Sixth switching transistor $S_6$ | Fifth switching transistor $S_5$ | Seventh switching transistor $S_7$ |
|---|---|---|---|---|
| Initial state | Turned-on | Turned-on | Turned-off | Turned-off |
| First step | Turned-off | Turned-on | Turned-off | Turned-off |
| Second step | Turned-off | Turned-on | Turned-on | Turned-off |
| Third step | Turned-off | Turned-off | Turned-on | Turned-off |
| Fourth step | Turned-off | Turned-off | Turned-on | Turned-on |

Figure 7B:
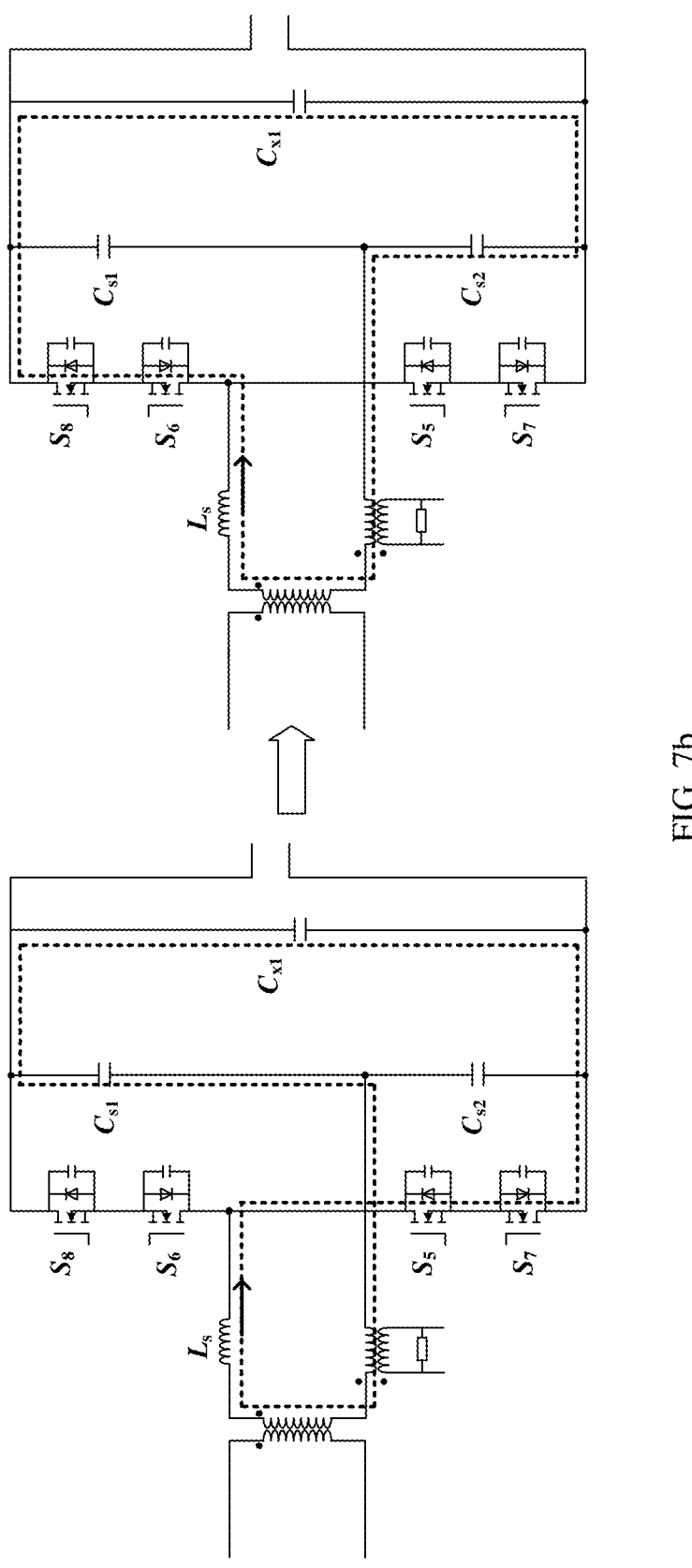
FIG. 7b is a schematic of another current freewheeling loop during switching of switching transistors in a control method of sending a PWM driver gating signal for a converter according to an embodiment.

FIG. 7b is a schematic of another current freewheeling loop during switching of switching transistors in a control method of sending a PWM driver gating signal for a converter according to an embodiment.

As shown in FIG. 7b, when it is determined that the current $i_r$ flowing through the inductive component is positive, an initial state of each switching transistor in the secondary-side circuit is that the fifth switching transistor $S_5$ and the seventh switching transistor $S_7$ are in the turned-on state, and the eighth switching transistor $S_8$ and the sixth switching transistor $S_6$ are in the turned-off state. Each switching transistor needs to be switched to a state that the fifth switching transistor $S_5$ and the seventh switching transistor $S_7$ are in the turned-off state, and the eighth switching transistor $S_8$ and the sixth switching transistor $S_6$ are in the turned-on state. As shown in Table 3-2, the following four steps need to be performed in the switching process. (1) The current $i_r$ flows along a dashed line in the left figure in FIG. 7b. Because a freewheeling direction of the seventh switching transistor $S_7$ in the turned-on state is the same as the flow direction, the seventh switching transistor $S_7$ may be turned off first. (2) After the seventh switching transistor $S_7$ is completely turned off, the current may be freewheeled through the diode of the seventh switching transistor $S_7$ to ensure a current freewheeling loop. For example, the current $i_r$ continues to flow along the dashed line in the left figure in FIG. 7b. Because a freewheeling direction of the sixth switching transistor $S_6$ in the turned-off state is opposite to the flow direction, the sixth switching transistor $S_6$ may be turned on. (3) After the sixth switching transistor $S_6$ is completely turned on, the fifth switching transistor $S_5$ whose freewheeling direction is opposite to the flow direction may be turned off. In this case, the current may be freewheeled through the diodes of the sixth switching transistor $S_6$ and the eighth switching transistor $S_8$ to ensure a current freewheeling loop. For example, the current it is switched to flow along a dashed line in the right figure in FIG. 7b. (4) After the fifth switching transistor $S_5$ is completely turned off, the eighth switching transistor $S_8$ whose freewheeling direction is the same as the flow direction may be turned on. In this case, the current may be freewheeled through the turned-on sixth switching transistor $S_6$ and the turned-on eighth switching transistor $S_8$ to ensure a current freewheeling loop.

TABLE 3-2

| $i_r > 0$ | Eighth switching transistor $S_8$ | Sixth switching transistor $S_6$ | Fifth switching transistor $S_5$ | Seventh switching transistor $S_7$ |
|---|---|---|---|---|
| Initial state | Turned-off | Turned-off | Turned-on | Turned-on |
| First step | Turned-off | Turned-off | Turned-on | Turned-off |
| Second step | Turned-off | Turned-on | Turned-on | Turned-off |
| Third step | Turned-off | Turned-on | Turned-off | Turned-off |
| Fourth step | Turned-on | Turned-on | Turned-off | Turned-off |

Figure 7C:
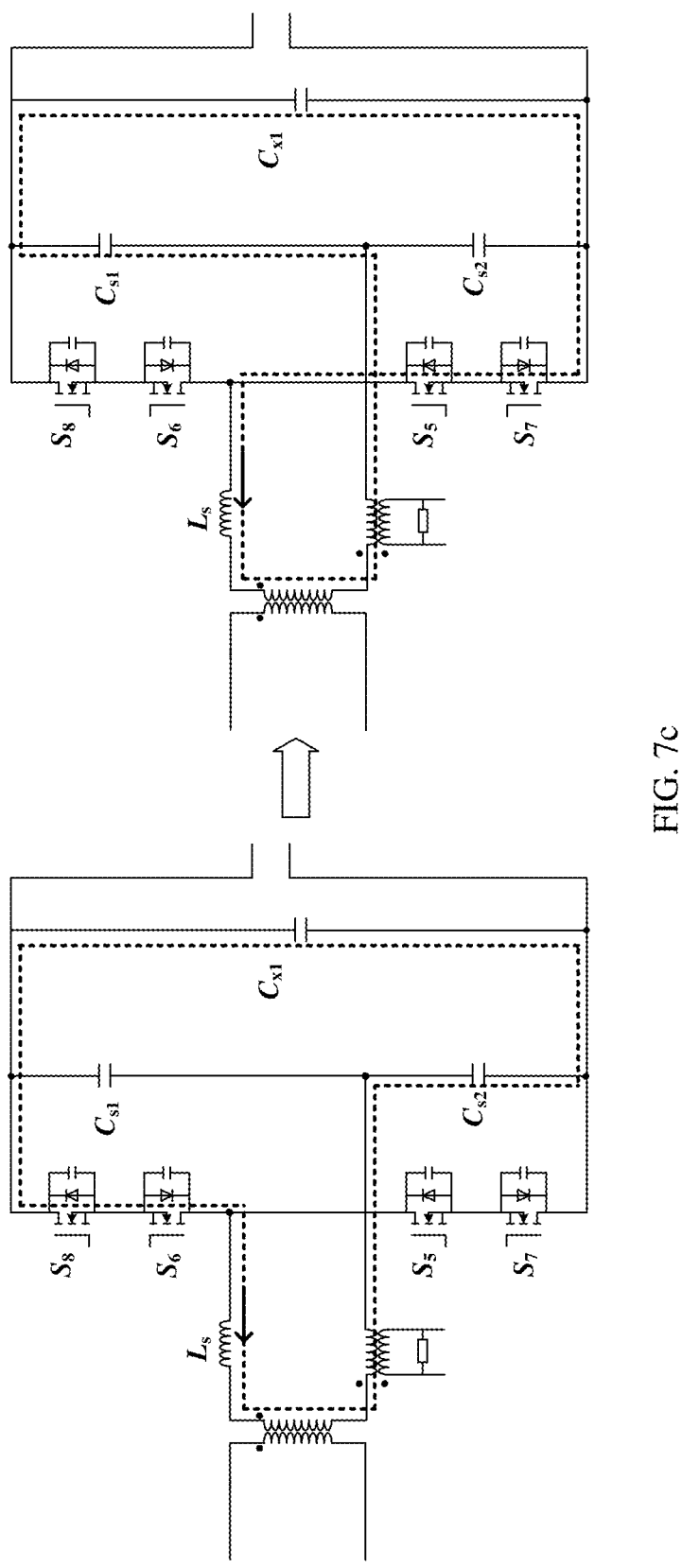
FIG. 7c is a schematic of another current freewheeling loop during switching of switching transistors in a control method of sending a PWM driver gating signal for a converter according to an embodiment.

FIG. 7c is a schematic of another current freewheeling loop during switching of switching transistors in a control method of sending a PWM driver gating signal for a converter according to an embodiment.

As shown in FIG. 7c, when it is determined that the current $i_r$ flowing through the inductive component is negative, an initial state of each switching transistor in the secondary-side circuit is that the eighth switching transistor $S_8$ and the sixth switching transistor $S_6$ are in the turned-on state, and the fifth switching transistor $S_5$ and the seventh switching transistor $S_7$ are in the turned-off state. Each switching transistor needs to be switched to a state that the eighth switching transistor $S_8$ and the sixth switching transistor $S_6$ are in the turned-off state, and the fifth switching transistor $S_5$ and the seventh switching transistor $S_7$ are in the turned-on state. As shown in Table 3-3, the following four steps need to be performed in the switching process. (1) The current $i_r$ flows along a dashed line in the left figure in FIG. 7c. Because a freewheeling direction of the sixth switching transistor $S_6$ in the turned-on state is the same as the flow direction, the sixth switching transistor $S_6$ may be turned off first. (2) After the sixth switching transistor $S_6$ is completely turned off, the current may be freewheeled through the diode of the sixth switching transistor $S_6$ to ensure a current freewheeling loop. For example, the current $i_r$ continues to flow along the dashed line in the left figure in FIG. 7c. Because a freewheeling direction of the seventh switching transistor $S_7$ in the turned-off state is opposite to the flow direction, the seventh switching transistor $S_7$ may be turned on. (3) After the seventh switching transistor $S_7$ is completely turned on, the eighth switching transistor $S_8$ whose freewheeling direction is opposite to the flow direction may be turned off. In this case, the current may be freewheeled through the diodes of the seventh switching transistor $S_7$ and the fifth switching transistor $S_5$ to ensure a current freewheeling loop. For example, the current $i_r$ is switched to flow along a dashed line in the right figure in FIG. 7*c*. (4) After the eighth switching transistor $S_8$ is completely turned off, the fifth switching transistor $S_5$ whose freewheeling direction is the same as the flow direction may be turned on. In this case, the current may be freewheeled through the turned-on seventh switching transistor $S_7$ and the turned-on fifth switching transistor $S_5$ to ensure a current freewheeling loop.

TABLE 3-3

| $i_r < 0$ | Eighth switching transistor $S_8$ | Sixth switching transistor $S_6$ | Fifth switching transistor $S_5$ | Seventh switching transistor $S_7$ |
|---|---|---|---|---|
| Initial state | Turned-on | Turned-on | Turned-off | Turned-off |
| First step | Turned-on | Turned-off | Turned-off | Turned-off |
| Second step | Turned-on | Turned-off | Turned-off | Turned-on |
| Third step | Turned-off | Turned-off | Turned-off | Turned-on |
| Fourth step | Turned-off | Turned-off | Turned-on | Turned-on |

Figure 7D:
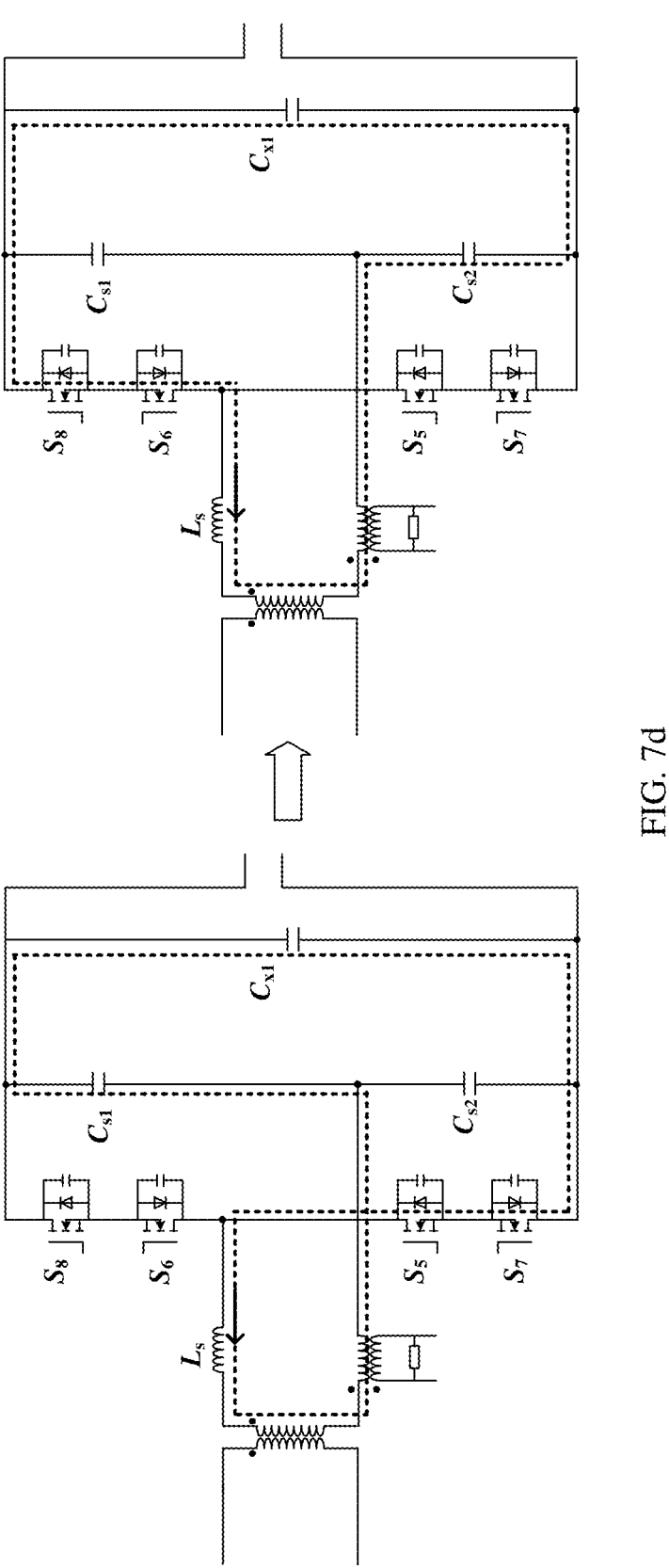
FIG. 7d is a schematic of another current freewheeling loop during switching of switching transistors in a control method of sending a PWM driver gating signal for a converter according to an embodiment.

FIG. 7*d* is a schematic of another current freewheeling loop during switching of switching transistors in a control method of sending a PWM driver gating signal for a converter according to an embodiment.

As shown in FIG. 7*d*, when it is determined that the current $i_r$ flowing through the inductive component is negative, an initial state of each switching transistor in the secondary-side circuit is that the fifth switching transistor $S_5$ and the seventh switching transistor $S_7$ are in the turned-on state, and the eighth switching transistor $S_8$ and the sixth switching transistor $S_6$ are in the turned-off state. Each switching transistor needs to be switched to a state that the fifth switching transistor $S_5$ and the seventh switching transistor $S_7$ are in the turned-off state, and the eighth switching transistor $S_8$ and the sixth switching transistor $S_6$ are in the turned-on state. As shown in Table 3-4, the following four steps need to be performed in the switching process. (1) The current $i_r$ flows along a dashed line in the left figure in FIG. 7*d*. Because a freewheeling direction of the fifth switching transistor $S_5$ in the turned-on state is the same as the flow direction, the fifth switching transistor $S_5$ may be turned off first. (2) After the fifth switching transistor $S_5$ is completely turned off, the current may be freewheeled through the diode of the fifth switching transistor $S_5$ to ensure a current freewheeling loop. For example, the current $i_r$ continues to flow along the dashed line in the left figure in FIG. 7*d*. Because a freewheeling direction of the eighth switching transistor $S_8$ in the turned-off state is opposite to the flow direction, the eighth switching transistor $S_8$ may be turned on. (3) After the eighth switching transistor $S_8$ is completely turned on, the seventh switching transistor $S_7$ whose freewheeling direction is opposite to the flow direction may be turned off. In this case, the current may be freewheeled through the diodes of the eighth switching transistor $S_8$ and the sixth switching transistor $S_6$ to ensure a current freewheeling loop. For example, the current $i_r$ is switched to flow along a dashed line in the right figure in FIG. 7*d*. (4) After the seventh switching transistor $S_7$ is completely turned off, the sixth switching transistor $S_6$ whose freewheeling direction is the same as the flow direction may be turned on. In this case, the current may be freewheeled through the turned-on eighth switching transistor $S_8$ and the turned-on sixth switching transistor $S_6$ to ensure a current freewheeling loop.

TABLE 3-4

| $i_r < 0$ | Eighth switching transistor $S_8$ | Sixth switching transistor $S_6$ | Fifth switching transistor $S_5$ | Seventh switching transistor $S_7$ |
|---|---|---|---|---|
| Initial state | Turned-off | Turned-off | Turned-on | Turned-on |
| First step | Turned-off | Turned-off | Turned-off | Turned-on |
| Second step | Turned-on | Turned-off | Turned-on | Turned-off |
| Third step | Turned-off | Turned-on | Turned-off | Turned-off |
| Fourth step | Turned-on | Turned-on | Turned-off | Turned-off |

When it is determined that the current $i_r$ flowing through the inductive component is approximately zero, an initial state of each switching transistor in the secondary-side circuit is that the eighth switching transistor $S_8$ and the sixth switching transistor $S_6$ are in the turned-on state, and the fifth switching transistor $S_5$ and the seventh switching transistor $S_7$ are in the turned-off state. Each switching transistor needs to be switched to a state that the eighth switching transistor $S_8$ and the sixth switching transistor $S_6$ are in the turned-off state, and the fifth switching transistor $S_5$ and the seventh switching transistor $S_7$ are in the turned-on state. The following two steps need to be performed in the switching process. (1) Both the eighth switching transistor $S_8$ and the sixth switching transistor $S_6$ are turned off. (2) After the eighth switching transistor $S_8$ and the sixth switching transistor $S_6$ are completely turned off, both the fifth switching transistor $S_5$ and the seventh switching transistor $S_7$ are turned on.

When it is determined that the current $i_r$ flowing through the inductive component is approximately zero, an initial state of each switching transistor in the secondary-side circuit is that the fifth switching transistor $S_5$ and the seventh switching transistor $S_7$ are in the turned-on state, and the eighth switching transistor $S_8$ and the sixth switching transistor $S_6$ are in the turned-off state. Each switching transistor needs to be switched to a state that the fifth switching transistor $S_5$ and the seventh switching transistor $S_7$ are in the turned-off state, and the eighth switching transistor $S_8$ and the sixth switching transistor $S_6$ are in the turned-on state. The following two steps need to be performed in the switching process. (1) Both the fifth switching transistor $S_5$ and the seventh switching transistor $S_7$ are turned off. (2) After the fifth switching transistor $S_5$ and the seventh switching transistor $S_7$ are completely turned off, the eighth switching transistor $S_8$ and the sixth switching transistor $S_6$ are turned on.

The foregoing describes in detail the switching of the on-off state of the switching transistor in the six working conditions according to the control method of sending a PWM driver gating signal provided in embodiments.

It is clear that a person skilled in the art can make various modifications and variations to the embodiments without departing from their scope. The embodiments are intended to cover these modifications and variations.

What is claimed is:

1. A converter, comprising:
a transformer,
an inductive component,
a primary-side circuit, wherein the primary-side circuit is connected to a primary-side winding of the transformer;
a secondary-side circuit, wherein the secondary-side circuit is connected in series to the inductive component and then connected to a secondary-side winding of the transformer, the secondary-side circuit comprises a half-bridge circuit that comprises;

a bridge arm, wherein the bridge arm comprises an upper half-bridge arm and a lower half-bridge arm, the upper half-bridge arm or the lower half-bridge arm comprises two switching transistors with opposite freewheeling directions, and a connection point of the upper half-bridge arm and the lower half-bridge arm is connected to a first end of the secondary-side winding of the transformer by using the inductive component, a first capacitor, and a second capacitor, wherein; the first capacitor and the second capacitor are connected in series and then connected in parallel to the bridge arm; a connection point of the first capacitor and the second capacitor is connected to a second end of the secondary-side winding of the transformer, the secondary-side circuit further comprises a third capacitor that is connected in parallel to the bridge arm; and a controller configured to:

after an alternating current voltage output by the converter is greater than or equal to a specified negative voltage threshold and is less than or equal to a specified positive voltage threshold, control the converter to switch between an upper half-bridge arm straight-through mode and a lower half-bridge arm straight-through mode, wherein in the upper half-bridge arm straight-through mode, the inductive component, the upper half-bridge arm, the third capacitor, the second capacitor, and the secondary-side winding form a current path, and in the lower half-bridge arm straight-through mode, the inductive component, the lower half-bridge arm, the third capacitor, the first capacitor, and the secondary-side winding form the current path; and after a current flowing through the inductive component is greater than or equal to a specified negative current threshold and is less than or equal to a specified positive current threshold, sequentially:

control all switching transistors in the upper half-bridge arm or the lower half-bridge arm that is in a straight-through state to be turned off, and control all switching transistors in the upper half-bridge arm or the lower half-bridge arm that is in a cut-off state to be turned on, to enable the converter to implement mutual switching between the upper half-bridge arm straight-through mode and the lower half-bridge arm straight-through mode; and after the current flowing through the inductive component is less than the specified negative current threshold or is greater than the specified positive current threshold, sequentially:

control a subset of the switching transistors that are in the straight-through state in the upper half-bridge arm or the lower half-bridge arm to be turned off, control a subset of the switching transistors that are in the cut-off state in the upper half-bridge arm or the lower half-bridge arm to be turned on, control all of the switching transistors that are in the straight-through state in the upper half-bridge arm or the lower half-bridge arm to be turned off, and control all of the switching transistors that are in the cut-off state in the upper half-bridge arm or the lower half-bridge arm to be turned on, to enable the converter to implement mutual switching between the upper half-bridge arm straight-through mode and the lower half-bridge arm straight-through mode.

2. The converter according to claim 1, wherein the upper half-bridge arm comprises a sixth switching transistor and an eighth switching transistor that are connected in series, the lower half-bridge arm comprises a fifth switching transistor and a seventh switching transistor that are connected in series, freewheeling directions of the fifth switching transistor and the sixth switching transistor both point to the connection point of the upper half-bridge arm and the lower half-bridge arm, and freewheeling directions of the seventh switching transistor and the eighth switching transistor both point away from the connection point of the upper half-bridge arm and the lower half-bridge arm.

3. The converter according to claim 2, wherein the sixth switching transistor is connected between the eighth switching transistor and the inductive component, or the eighth switching transistor is connected between the sixth switching transistor and the inductive component; and the fifth switching transistor is connected between the seventh switching transistor and the inductive component, or the seventh switching transistor is connected between the fifth switching transistor and the inductive component.

4. The converter according to claim 2, wherein after current flowing through the inductive component is greater than or equal to the specified negative current threshold and is less than or equal to the specified positive current threshold, the controller is further configured to sequentially:

control both the sixth switching transistor and the eighth switching transistor that are in a turned-on state to be turned off, and control both the fifth switching transistor and the seventh switching transistor that are in a turned-off state to be turned on.

5. The converter according to claim 2, wherein after the current flowing through the inductive component is greater than or equal to the specified negative current threshold and is less than or equal to the specified positive current threshold, the controller is further configured to sequentially:

control both the fifth switching transistor and the seventh switching transistor that are in a turned-on state to be turned off, and control both the sixth switching transistor and the eighth switching transistor that are in a turned-off state to be turned on.

6. The converter according to claim 2, wherein after the current flowing through the inductive component is greater than the specified positive current threshold, the controller is further configured to sequentially:

control the eighth switching transistor in a turned-on state to be turned off, control the fifth switching transistor in a turned-off state to be turned on, control the sixth switching transistor in the turned-on state to be turned off, and control the seventh switching transistor in the turned-off state to be turned on.

7. The converter according to claim 2, wherein after the current flowing through the inductive component is greater than the specified positive current threshold, the controller is further configured to sequentially:

control the seventh switching transistor in a turned-on state to be turned off, control the sixth switching transistor in a turned-off state to be turned on,

19 control the fifth switching transistor in the turned-on state
to be turned off, and
control the eighth switching transistor in the turned-off
state to be turned on.

8. The converter according to claim 2, wherein after the
current flowing through the inductive component is less than
the specified negative current threshold, the controller is
further configured to sequentially:
control the sixth switching transistor in a turned-on state
to be turned off,
control the seventh switching transistor in a turned-off
state to be turned on,
control the eighth switching transistor in the turned-on
state to be turned off, and
control the fifth switching transistor in the turned-off state
to be turned on.

9. The converter according to claim 2, wherein after the
current flowing through the inductive component is less than
the specified negative current threshold,
the controller is further configured to sequentially:
control the fifth switching transistor in a turned-on state to
be turned off,
control the eighth switching transistor in a turned-off state
to be turned on,
control the seventh switching transistor in the turned-on
state to be turned off, and
control the sixth switching transistor in the turned-off
state to be turned on.

10. The converter according to claim 1, wherein the
controller is further configured to:
after a switching action of controlling a switching tran-
sistor to change an on-off state is completed, control
another switching transistor to start to perform the
switching action to change the on-off state.

11. A control method for a converter, comprising:
after an alternating current voltage output by the converter
is greater than or equal to a specified negative voltage
threshold and is less than or equal to a specified positive
voltage threshold,
controlling the converter to switch between an upper
half-bridge arm straight-through mode and a lower
half-bridge arm straight-through mode, wherein
in the upper half-bridge arm straight-through mode, an
inductive component, an upper half-bridge arm, a third
capacitor, a second capacitor, and a secondary-side
winding form a current path, and
in the lower half-bridge arm straight-through mode, the
inductive component, a lower half-bridge arm, the third
capacitor, a first capacitor, and the secondary-side
winding form the current path; and
after a current flowing through the inductive component is
greater than or equal to a specified negative current
threshold and is less than or equal to a specified positive
current threshold,
controlling switching transistors that are in a straight-
through state in the upper half-bridge arm or the lower
half-bridge arm to be turned off, and
controlling switching transistors that are in a cut-off state
in the upper half-bridge arm or the lower half-bridge
arm to be turned on, to enable the converter to imple-
ment mutual switching between the upper half-bridge
arm straight-through mode and the lower half-bridge
arm straight-through mode; and
after, the current flowing through the inductive compo-
nent is less than the specified negative current threshold
or is greater than the specified positive current thresh-
old,

20 sequentially controlling a subset of the switching transis-
tors that are in the straight-through state in the upper
half-bridge arm or the lower half-bridge arm to be
turned off;
controlling a subset of the switching transistors that are in
the cut-off state in the upper half-bridge arm or the
lower half-bridge arm to be turned on;
controlling all of the switching transistors that are in the
straight-through state in the upper half-bridge arm or
the lower half-bridge arm to be turned off; and
controlling all of the switching transistors that are in the
cut-off state in the upper half-bridge arm or the lower
half-bridge arm to be turned on, to enable the converter
to implement mutual switching between the upper
half-bridge arm straight-through mode and the lower
half-bridge arm straight-through mode.

12. The control method according to claim 11, wherein the
upper half-bridge arm comprises a sixth switching transistor
and an eighth switching transistor that are connected in
series, and the lower half-bridge arm comprises a fifth
switching transistor and a seventh switching transistor that
are connected in series, freewheeling directions of the fifth
switching transistor and the sixth switching transistor both
point to the connection point of the upper half-bridge arm
and the lower half-bridge arm, and freewheeling directions
of the seventh switching transistor and the eighth switching
transistor both point away from the connection point of the
upper half-bridge arm and the lower half-bridge arm.

13. The control method according to claim 12, wherein
the sixth switching transistor is connected between the
eighth switching transistor and the inductive compo-
nent, or
the eighth switching transistor is connected between the
sixth switching transistor and the inductive component;
and
the fifth switching transistor is connected between the
seventh switching transistor and the inductive compo-
nent, or
the seventh switching transistor is connected between the
fifth switching transistor and the inductive component.

14. The control method according to claim 12, further
comprising, after the current flowing through the inductive
component is greater than or equal to the specified negative
current threshold and is less than or equal to the specified
positive current threshold, sequentially:
controlling both the sixth switching transistor and the
eighth switching transistor that are in a turned-on state
to be turned off, and
controlling both the fifth switching transistor and the
seventh switching transistor that are in a turned-off
state to be turned on.

15. The control method according to claim 12, further
comprising, after the current flowing through the inductive
component is greater than or equal to the specified negative
current threshold and is less than or equal to the specified
positive current threshold, sequentially:
controlling both the fifth switching transistor and the
seventh switching transistor that are in a turned-on state
to be turned off, and
controlling both the sixth switching transistor and the
eighth switching transistor that are in a turned-off state
to be turned on.

16. The control method according to claim 12, further
comprising, after the current flowing through the inductive
component is greater than the specified positive current
threshold, sequentially:

controlling the eighth switching transistor in a turned-on state to be turned off;

controlling the fifth switching transistor in a turned-off state to be turned on;

controlling the sixth switching transistor in the turned-on state to be turned off; and controlling the seventh switching transistor in the turned-off state to be turned on.

17. The control method according to claim 12, further comprising, after the current flowing through the inductive component is greater than the specified positive current threshold, sequentially:

controlling the eighth switching transistor in a turned-on state to be turned off; controlling the fifth switching transistor in a turned-off state to be turned on;

controlling the sixth switching transistor in the turned-on state to be turned off; and controlling the seventh switching transistor in the turned-off state to be turned on.

18. The control method according to claim 12, further comprising, after the current flowing through the inductive component is less than the specified negative current threshold, sequentially:

controlling the sixth switching transistor in a turned-on state to be turned off, controlling the seventh switching transistor in a turned-off state to be turned on, controlling the eighth switching transistor in the turned-on state to be turned off, and controlling the fifth switching transistor in the turned-off state to be turned on.

19. The control method according to claim 12, further comprising, after the current flowing through the inductive component is less than the specified negative current threshold, sequentially:

controlling the fifth switching transistor in a turned-on state to be turned off;

controlling the eighth switching transistor in a turned-off state to be turned on;

controlling the seventh switching transistor in the turned-on state to be turned off; and controlling the sixth switching transistor in the turned-off state to be turned on.

20. The control method according to claim 11, further comprising, after a switching action of controlling a switching transistor to change an on-off state is completed, controlling another switching transistor to start to perform the switching action to change the on-off state.

* * * * *